United States Patent
Vukich et al.

(10) Patent No.: US 11,487,843 B2
(45) Date of Patent: Nov. 1, 2022

(54) BLOCKING DECEPTIVE ONLINE CONTENT

(71) Applicant: Capital One Services, LLC, McLean, VA (US)

(72) Inventors: Adam Vukich, Alexandria, VA (US); Abdelkader M'Hamed Benkreira, New York, NY (US); Joshua Edwards, Philadelphia, PA (US)

(73) Assignee: Capital One Services, LLC, McLean, VA (US)

(*) Notice: Subject to any disclaimer, the term of this patent is extended or adjusted under 35 U.S.C. 154(b) by 47 days.

(21) Appl. No.: 16/910,229

(22) Filed: Jun. 24, 2020

(65) Prior Publication Data
US 2020/0387558 A1 Dec. 10, 2020

Related U.S. Application Data

(63) Continuation of application No. 16/435,920, filed on Jun. 10, 2019, now Pat. No. 10,733,261.

(51) Int. Cl.
*G06F 15/16* (2006.01)
*G06F 16/958* (2019.01)
(Continued)

(52) U.S. Cl.
CPC .......... *G06F 16/958* (2019.01); *G06F 16/951* (2019.01); *G06F 16/955* (2019.01);
(Continued)

(58) Field of Classification Search
CPC .. G06F 16/958; G06F 16/9532; G06F 16/955; G06F 16/9535; G06F 16/951; G06K 9/4609
(Continued)

(56) References Cited

U.S. PATENT DOCUMENTS 7,783,622 B1 8/2010 Vandermolen et al.
8,234,168 B1* 7/2012 Lagle Ruiz ........ G06Q 30/0267
705/14.64

(Continued)

OTHER PUBLICATIONS

Storey, Grant et al. "The Future of Ad Blocking: An Analytical Framework and New Techniques". May 24, 2017. pp. 1-17. (Year: 2017).*

(Continued)

*Primary Examiner* — Imad Hussain
(74) *Attorney, Agent, or Firm* — DLA Piper LLP (US)

(57) ABSTRACT

In one aspect, the present disclosure relates to a method for reducing fraud in computer networks, the method including receiving, from each of a plurality of user devices, a request to block an ad displayed within a web browser installed on the user device, the request comprising image data and a forwarding URL associated with the ad; storing crowdsourced ad blocking data based on the received requests to block ads; receiving a request for a list of blocked ads; generating a list of blocked ads based on analyzing the crowdsourced ad blocking data, wherein analyzing the crowdsourced ad blocking data comprises identifying ads blocked by at least a threshold number of users; and sending the list of blocked ads to a first user device, the first user device comprising a browser extension configured to prevent ads within the list of blocked ads from being rendered in a browser.

20 Claims, 8 Drawing Sheets

(51) Int. Cl.
*G06F 16/951* (2019.01)
*G06F 16/9532* (2019.01)
*G06F 16/955* (2019.01)
*G06F 16/9535* (2019.01)
*G06V 10/44* (2022.01)

(52) U.S. Cl.
CPC ...... *G06F 16/9532* (2019.01); *G06F 16/9535* (2019.01); *G06V 10/443* (2022.01)

(58) Field of Classification Search
USPC ........................................................ 709/203
See application file for complete search history.

(56) References Cited

U.S. PATENT DOCUMENTS

| | | | |
|---|---|---|---|
| 8,473,339 | B1 | 6/2013 | McKennon et al. |
| 9,208,316 | B1* | 12/2015 | Hill ........................ G06F 21/566 |
| 9,367,823 | B1 | 6/2016 | Mihalik et al. |
| 10,262,343 | B1 | 4/2019 | Orekhov et al. |
| 10,296,552 | B1 | 5/2019 | Malin et al. |
| 10,425,439 | B1 | 9/2019 | Subramanian et al. |
| 10,733,261 | B1* | 8/2020 | Vukich ................ G06V 10/443 |
| 2006/0277264 | A1 | 12/2006 | Rainisto |
| 2007/0146812 | A1 | 6/2007 | Lawton |
| 2007/0192855 | A1 | 8/2007 | Hulten et al. |
| 2009/0106785 | A1 | 4/2009 | Pharn |
| 2009/0220166 | A1* | 9/2009 | Choi ........................ H04L 51/12 382/260 |
| 2010/0205259 | A1 | 8/2010 | Vitaldevara et al. |
| 2011/0060998 | A1 | 3/2011 | Schwartz et al. |
| 2011/0179492 | A1 | 7/2011 | Markopoulou et al. |
| 2011/0258049 | A1 | 10/2011 | Ramer et al. |
| 2012/0173315 | A1 | 7/2012 | Martini et al. |
| 2015/0019350 | A1 | 1/2015 | Grant et al. |
| 2015/0070516 | A1 | 3/2015 | Shoemake et al. |
| 2015/0161672 | A1 | 6/2015 | Jung et al. |
| 2015/0324827 | A1 | 11/2015 | Upstone et al. |
| 2016/0283975 | A1* | 9/2016 | Kaul ........................ G06Q 50/01 |
| 2017/0085933 | A1 | 3/2017 | Czeck, Jr. et al. |
| 2017/0287023 | A1 | 10/2017 | Koch et al. |
| 2018/0013774 | A1 | 1/2018 | Sander et al. |
| 2018/0101507 | A1 | 4/2018 | Malca |
| 2019/0220889 | A1 | 7/2019 | Wei et al. |

OTHER PUBLICATIONS

Chum, et al., "Near Duplicate Image Detection: min-Hash and tf-idf Weighting", BMVC, vol. 810, 2008, 10 pages.

u/Razaberry, "Uhm, a marketing suggestion for AdBlock . . . ", Reddit, https://www.reddit.com/r/Adblock/comments/7nxksk/uhm_a_marketing_suggestion_for_adblock/, Jan. 3, 2018, 1 page.

EasyList, "Overview", https://easylist.to/, printed on Nov. 2, 2018, 2 pages.

Melendez, "Hey Facebook users, the makers of Adblock Plus want your screenshots to train its AI", FastCompany: Mind and Machine, https://www.fastcompany.com/90177693/hey-facebook-users-the-makers-of-adblock-plus-want-your-screenshots-to-train-its-ai, Jun. 28, 2018, 9 pages.

Reddit, "How to hide large image banners on GOG.com store pages?", 2018, pp. 1-3.

McNeil, "How to block ads like a pro", Search Labs, Jul. 19, 2018, 35 pages.

Adblock Plus, "Simple image filter by width/height (size)", Apr. 2015, 2 pages.

Storey, et al., "The Future of Ad Blocking: An Analytical Framework and New Techniques", Apr. 14, 2017, 17 pages.

* cited by examiner

BLOCKING DECEPTIVE ONLINE CONTENT

CROSS-REFERENCE TO RELATED APPLICATION INFORMATION

This is a continuation of U.S. patent application Ser. No. 16/435,920, filed Jun. 10, 2019, which is incorporated herein by reference in its entirety.

BACKGROUND

Online content has been used as a vector for launching phishing attacks and other types of scams. Generally referred to as deceptive online content, some online content is designed to deceive internet users and scam or steal their information. An example of deceptive online content may be online advertisements. For example, a scammer may design an ad that appears to be promoting a service offered by a reputable company. However, the ad may be configured such that when a user clicks on the ad, the user is redirected to a phishing website intended to steal the user's login credentials, credit card information, or other personal information. As another example, scammers have created ads that purport to offer a chance to win free goods/services but are in fact intended only to collect personal information. Such ads may be generally referred to as "deceptive ads" and can be contrasted with ads for legitimate goods and services.

In addition, online advertising is an important source of revenue for many businesses, including publishers, content providers, and service providers. Online advertising is also a primary source of income for many independent journalists, authors, and artists.

Existing ad-blocking tools are designed to identify and block advertising in a content-neutral manner, for example by blocking all content that originates from a particular network address or domain. Existing tools do not differentiate between deceptive ads and legitimate ads. While such indiscriminate ad blocking may be desirable by some users, it is unsustainable for publishers and other websites that rely on advertising revenue to operate. As a result, website operators are increasingly employing techniques to detect ad-blockers and prevent users from accessing their sites while using ad-blockers.

SUMMARY

According to an aspect of the present disclosure, a method to reduce fraud in computer networks can include: receiving, from each of a plurality of user devices, a request to block an ad displayed within a web browser installed on the user device, the request comprising image data and a forwarding uniform resource locator (URL) associated with the ad; storing, by a server device, crowdsourced ad blocking data based on the received requests to block ad; receiving, from a first user device of the plurality of user devices, a request for a list of blocked ads; in response to receiving the request for a list of blocked ads, generating a list of blocked ads based on analyzing the crowdsourced ad blocking data, wherein analyzing the crowdsourced ad blocking data comprises identifying ads blocked by at least a threshold number of users; and sending the list of blocked ads to the first user device, the first user device comprising a browser extension configured to prevent ads within the list of blocked ads from being rendered in a browser.

In some embodiments, the browser extension of the first user device may be configured to prevent ads within the list of blocked ads from being rendered in a browser by comparing image data. In some embodiments, the browser extension of the first user device may be configured to prevent ads within the list of blocked ads from being rendered in a browser using near-duplicate image comparison. In some embodiments, the browser extension of the first user device may be configured to prevent ads within the list of blocked ads from being rendered in a browser by subtracting out regions with text from the image and comparing background image data. In some embodiments, the browser extension of the first user device may be configured to prevent ads within the list of blocked ads from being rendered in a browser by comparing forwarding URLs. In some embodiments, the browser extension of the first user device may be configured to prevent ads within the list of blocked ads from being rendered in a browser by comparing forwarding URLs only up to, but not including, the query parameters.

In some embodiments, the one or more requests to block ads may include an indication of whether the ad is fraudulent and the method to reduce fraud in computer networks may include analyzing the crowdsourced ad blocking data to identify an ad indicated as fraudulent by at least a threshold number of users; and reporting the identified ad to a third party agency or organization. In some embodiments, analyzing the crowdsourced ad blocking data may include excluding blocking data received from users that have sent more than a threshold number of ad block requests. In some embodiments, analyzing the crowdsourced ad blocking data may include excluding blocking data received from users that have sent more than a threshold number of ad block requests for a pre-determined amount of time. In some embodiments, excluding blocking data received from users that have sent more than a threshold number of ad block requests may include sending a notification to the user informing them that their ad block requests are being excluded.

According to another aspect of the present disclosure, a method to reduce fraud in computer networks may include activating, by a browser extension, an ad blocking tool enabling a user to select one or more ads displayed within a web browser installed on a user device; in response to the user selecting an ad, obtaining image data and a forwarding URL associated with the ad; and sending, to a server device, a request to block the ad, the request comprising the image data and forwarding URL. In some embodiments, the method to reduce fraud in computer networks may include receiving, from the server device, a list of blocked ads, wherein the server device is configured to generate the list of blocked ads using crowdsourced ad blocking data; and manipulating, by the browser extension, web pages rendered in the web browser to block ads included in the list of blocked ads. In some embodiments, manipulating web pages rendered in the web browser may include comparing image data associated with the list of blocked ads. In some embodiments, comparing image data associated with the list of blocked ads may include using near-duplicate image comparison. In some embodiments, comparing image data associated with the list of blocked ads may include subtracting out regions with text from the image and comparing background image data.

In some embodiments, manipulating web pages rendered in the web browser may include comparing forwarding URLs associated with list of blocked ads. In some embodiments, manipulating web pages rendered in the web browser may include comparing forwarding URLs only up to, but not including, the query parameters. In some embodiments, the method to reduce fraud in computer networks may include downloading the browser extension from the server device. In some embodiments, the method to reduce fraud in computer networks may include receiving a notification indicating that a user's ad block requests are being excluded due to sending more than a threshold number of ad block requests.

According to another aspect of the present disclosure, a computer-readable medium may include instructions stored thereon. When executed by a machine, the instructions may cause the machine to execute a process operable to: receive, from one or more of a plurality of user devices, a request to block an ad displayed within a web browser installed on the user device, wherein the request may include image data and a forwarding URL associated with the ad; store crowdsourced ad blocking data based on the received requests to block ads; in response to receiving the request for a list of blocked ads, generate a list of blocked ads based on analyzing the crowdsourced ad blocking data, wherein analyzing the crowdsourced ad blocking data may include identifying ads blocked by at least a threshold number of users; and send the list of blocked ads to one or more of the plurality of user devices, wherein at least one of the plurality of user devices may contain a browser extensions configured to prevent ads within the list of blocked ads from being rendered in a browser. At least one of the plurality of user devices may be configured to activate, by a browser extension, an ad blocking tool enabling a user associated with the user device to select one or more ads displayed within a web browser installed on the user device; in response to the user selecting an ad, obtain image data and a forwarding URL associated with the ad; and send, to a server device, a request to block the ad, the request comprising the image data and forwarding URL.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure relate to systems and methods for blocking deceptive online advertisements using crowdsourced data and machine learning (ML) techniques. In some embodiments, an ad-blocker may be implemented as a browser or app extension that users can download and install on their respective devices. The ad-blocker may include a graphical user interface (GUI) with controls that allow a user to report ads as deceptive. In some embodiments, once an ad is reported as deceptive, information about that ad may be sent to a centralized server and stored along with information about ads reported by other users. In some embodiments, the ad-blocker may use crowdsourced information to analyze the contents of ads and subsequently disable, hide, or otherwise block ads that are deemed to be deceptive. The systems and methods disclosed herein can protect users from deceptive online ads without blocking legitimate advertisements. Thus, in contrast to existing ad blocking techniques, the instant disclosure allows content providers (e.g. publishers) to continue to earn ad revenue, while at the same time protecting users from phishing attacks and other scams.

Figure 1:
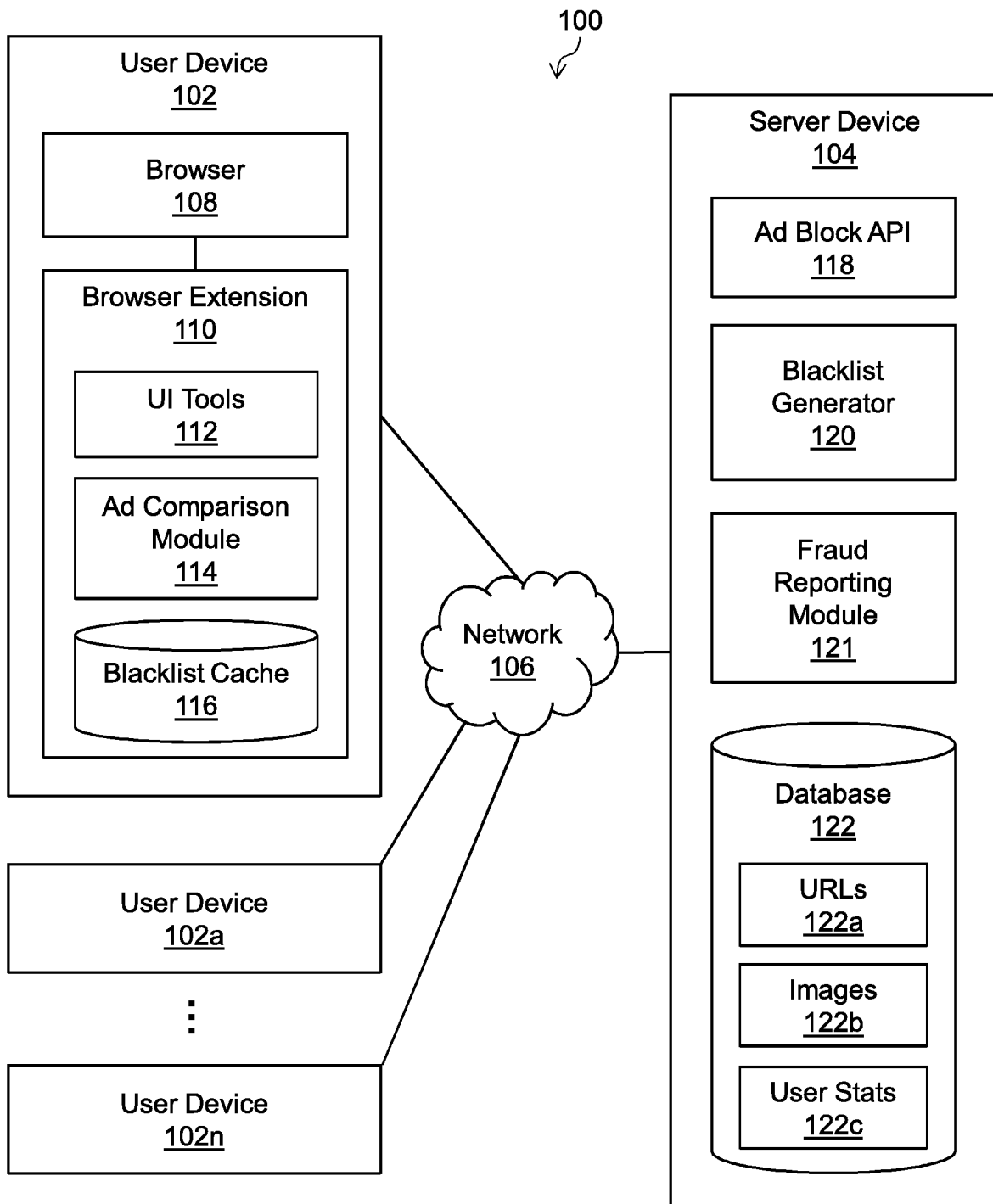
FIG. 1 is a block diagram of an illustrative system for blocking online advertisements, according to some embodiments of the present disclosure.

FIG. 1 shows an illustrative system 100 for blocking online advertisements, according to some embodiments of the present disclosure. System 100 can include one or more user devices 102a, 102b, . . . , 102n (102 generally) communicably coupled to server device 104 via a network 106.

Service device 104 may include any combination of one or more of web servers, mainframe computers, general-purpose computers, personal computers, or other types of computing devices. Server device 104 may represent distributed servers that are remotely located and communicate over a communications network, or over a dedicated network such as a local area network (LAN). Server device 104 may also include one or more back-end servers for carrying out one or more aspects of the present disclosure. In some embodiments, server device 104 may be the same as or similar to server device 500 described below in the context of FIG. 5.

As shown in FIG. 1, server device 104 can include ad block API module 118, blacklist generator module 120, a fraud reporting module 121 and a database 122. Ad block API module (or simply "API module") 118 may be configured to process various types of ad block-related requests received from user device 102 via network 106. For example, API module 118 may include an API endpoint for submitted new ad block requests, and another API endpoint for retrieving a list of blocked ads (referred to herein as "the blacklist").

Blacklist generator module 120 can compile a blacklist based on crowdsourced ad blocking data (e.g., data stored in database 122). The blacklist can contain information associated with each respective blocked ad, including domain names, forwarding URLs, image data, and user stats such as the number of users that have reported the ad as fraudulent. API module 118 may interface with blacklist generator module 120 such that when a user device 102 requests a blacklist, API module 118 can request that a blacklist be generated by blacklist generator module 120 and then send the generated blacklist to user device 102 via network 106. In some embodiments, fraud reporting module 121 can send details of blocked ads to agencies or organizations such as the Federal Communications Commission, Better Business Bureau, etc. In some embodiments, the reporting of ads may be automatically done once an ad has been reported a threshold number of times. In some embodiments, the decision on whether to report ads may be performed manually.

In the embodiment shown, database 122 can store crowdsourced ad blocking data including URLs 122a, images 122b, and user stats 122c. URLs 122a can include the URL of reported ads. In some embodiments, only the forwarding URL may be stored. In other embodiments, only the forwarding URL up to the query parameters may be stored. Images 122b can include image data of reported ads. User stats 122c can include statistics on reported ads, such as the number of users that have reported the ad as fraudulent. When a new ad block request is submitted, API module 118 may cause the database to be updated with the ad blocking data included with the request. API Module 118 may also cause the blacklist generator 120 to generate an updated blacklist based on the newly added ad blocking data. When server device 104 receives a request from user device 102 for a blacklist, API module 118 may retrieve the blacklist from database 122, which includes the crowdsourced ad blocking data for each respective blocked ad on the blacklist. The stored URLs 122a, images 122b, and user stats 122c may serve as a reference for preventing future ads from displaying on user device 102; if the URL or image data of an ad attempting to render matches an ad in the blacklist, it may be disabled, hidden, or otherwise blocked.

A user device 102 can include one or more computing devices capable of receiving user input as well as transmitting and/or receiving data via network 106 or communicating with server device 104. In some embodiments, user device 102 can include a conventional computer system, such as a desktop or laptop computer. Alternatively, user device 102 may include a device having computer functionality, such as a personal digital assistant (PDA), a mobile telephone, a smartphone, or other suitable device. In some embodiments, user device 102 may be the same as or similar to user device 600 described below in the context of FIG. 6.

As shown in FIG. 1, a user device 102 can include a web browser (or "browser") 108 that may display web pages, and a corresponding ad block browser extension 110. User device 102 may also be configured to receive generated blacklists from server device 104. Browser 108 may be any of a variety of conventional web browsers, including, but not limited to, Google Chrome™, Firefox, Internet Explorer, Microsoft Edge, or Safari®. Browser 108 may also be a custom browser developed by, for example, a financial institution (e.g., Capital One) and provided to customers of the financial institution. In addition to the features and extensions described herein, browser 108 can include other features such as a café browsing module that protects the users personal information.

Browser extension 110 may be a software component configured to add features to and enhance the functionality of the corresponding browser 108. In GOOGLE CHROME, browser extension 110 would be referred to as an "extension". In Firefox, browser extension 110 would be referred to as an "add-on". In Internet Explorer, browser extension 110 may be referred to as an "add-on", an "extension", or a "toolbar". In Microsoft Edge or SAFARI, browser extension 110 may be referred to as an "extension". Browser extension 110 can include UI tools 112, ad comparison module 114, and blacklist cache 116. Browser extension 110 may be downloaded from server device 104 to user device 102 and may be used to run an ad blocking tool within browser 108. Browser extension 110 may be configured to allow users to select deceptive ads with UI tools 112 and then send ad block requests to server device 104 via network 106.

UI tools 112 enable a user to select ads within browser 108. When browser extension 110 is activated and a user wishes to submit an ad block request for an ad, the user may select the html element (div/frame) that corresponds to the ad using UI tools 112. The selection may also capture image data, the referrer URL, the forwarding URL, or other metadata of the ad. UI tools 112 may also prompt the user to provide a reason for blocking the ad. After selection, the captured data is sent with an ad block request to server device 104 via network 106. Examples of UI tools 112 are described in more detail in the context of FIGS. 2A-2C below.

Ad comparison module 114 can compare crowdsourced ad blocking data of ads to determine if an ad should be disabled, hidden, or otherwise blocked from rendering within browser 108. When an ad attempts to render, ad comparison module 114 may compare the ad to a blacklist generated by blacklist generator 120 and stored in blacklist cache 116. If the ad matches an ad in the blacklist, browser extension 110 will prevent it from rendering. Ad comparison module 114 may compare the URL of the ad with the URLs of the blacklist to determine a match. Ad comparison module 114 may also determine if the content of the ad attempting to render matches an ad in the blacklist by comparing its image data with the image data of the ads in the blacklist via various machine learning techniques, which may include artificial neural networks, such as Siamese networks, convolutional neural networks, or other techniques that measure similarities in images. This may also include using so-called "near-duplicate" image comparison techniques that compare images with photometric, geometric, or other relatively minor discrepancies/alterations between. Examples of such techniques are described by Chum, O. Philbin, J. & Zisserman, A. in "Near Duplicate Image Detection: minHash and tf-idf Weighting" (BMVC 810, 812-815 (2008)), which paper is herein incorporated by reference in its entirety.

In some embodiments, machine learning models may be used that have been trained to detect deceptive ads based on the characterization of patterns of text. An OCR (optical character recognition) engine may be used to extract text from ads; the text may then be fed into the model to be characterized. In some embodiments, the model may include a supervised algorithm, such as supervised learning, where the model uses example input-output pairs to learn how to map new input objects (i.e. ads) to output objects (i.e. deceptive, legitimate). In some embodiments, the example input-output pairs may include ads known to be deceptive and ads known to be legitimate. In some embodiments, the model may include decision tree learning, where the model learns to place the target variable into different classifications, such as fraudulent or legitimate, characterizing an input item (i.e. ads) based on observations of the input item.

In some embodiments, ad comparison module 114 may be configured to subtract out areas of images with text via known techniques and compare the background image data with the ads in the blacklist via the machine learning and image comparison techniques described above. This can help to protect against deceptive ads that have had their text altered to differentiate them from known deceptive ads in an attempt to bypass ad blockers. If either the image data or the background image data of an ad attempting to render matches image data from the blacklist, the ad will be disabled, hidden, or otherwise blocked.

Blacklist cache 116 may store a blacklist for use by ad comparison module 114. This blacklist may be generated by blacklist generator 120 and sent from server device 104 to user device 102. As described earlier, the blacklist contains a list of blocked ads, ads that have been deemed deceptive, and each ad's respective metadata (URLs, image data, user stats). This serves as a reference for browser extension 110 to block deceptive ads based on crowdsourced data.

Network 106 may include one or more wide areas networks (WANs), metropolitan area networks (MANs), local area networks (LANs), personal area networks (PANs), or any combination of these networks. Network 106 may include a combination of one or more types of networks, such as Internet, intranet, Ethernet, twisted-pair, coaxial cable, fiber optic, cellular, satellite, IEEE 801.11, terrestrial, and/or other types of wired or wireless networks. Network 106 can also use standard communication technologies and/or protocols.

The various system components—such as modules 118, 120, 121 and browser extension 110—may be implemented using hardware and/or software configured to perform and execute the processes, steps, or other functionality described in conjunction therewith.

Figure 2A:
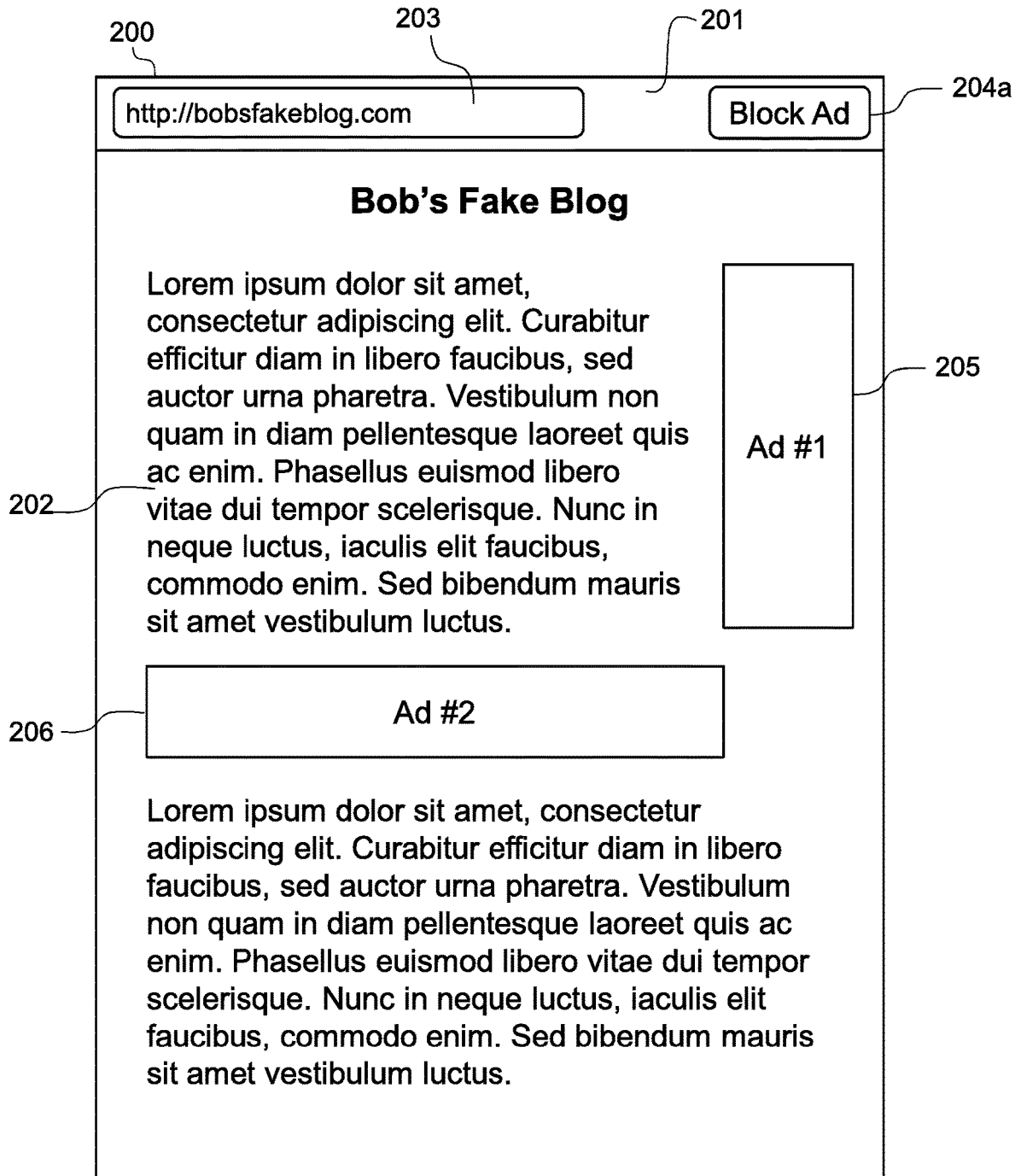
FIGS. 2A, 2B, and 2C show illustrative graphical user interfaces (GUIs) for blocking online advertisements, according to some embodiments of the present disclosure.
Figure 2B:
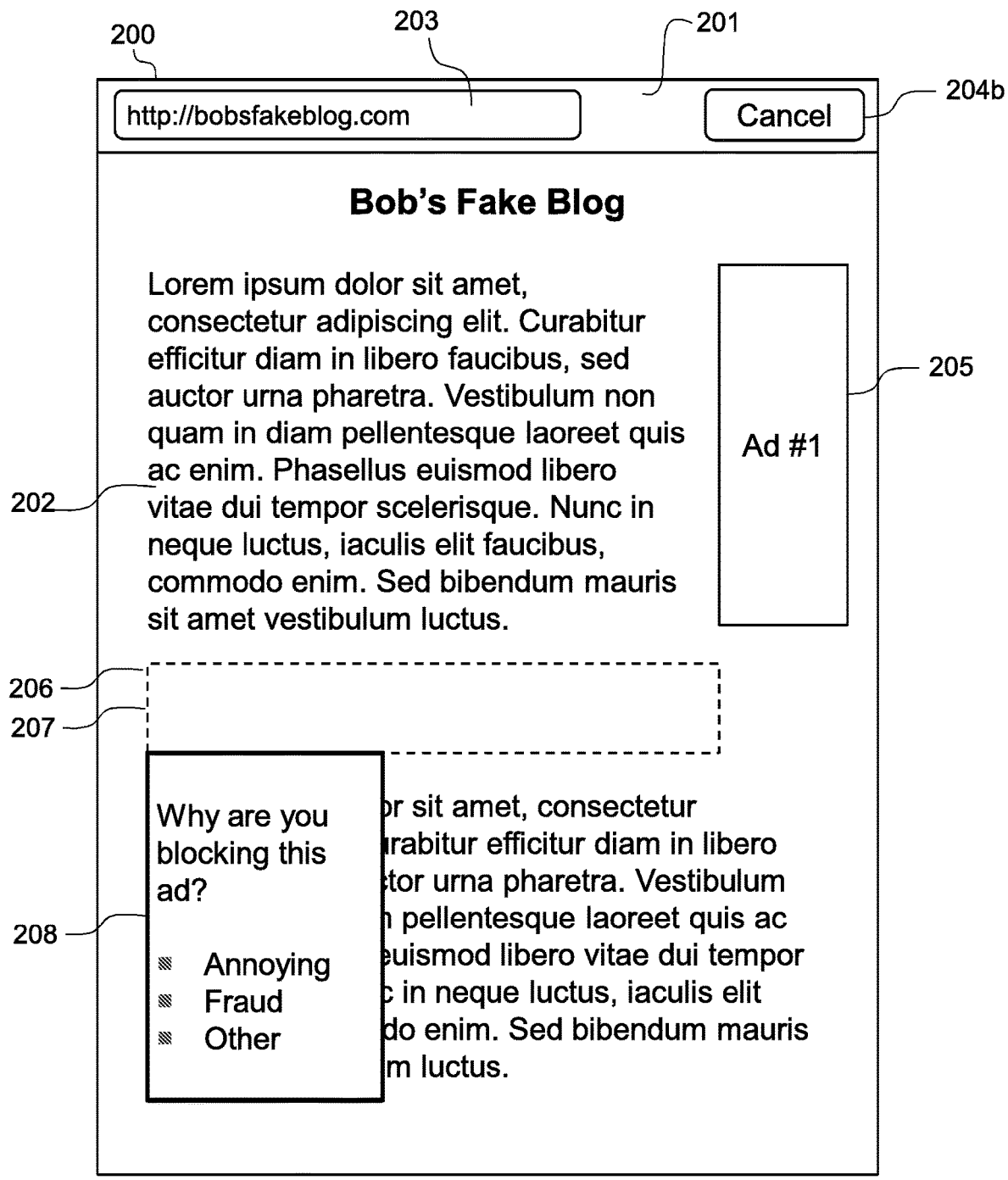
Figure 2C:
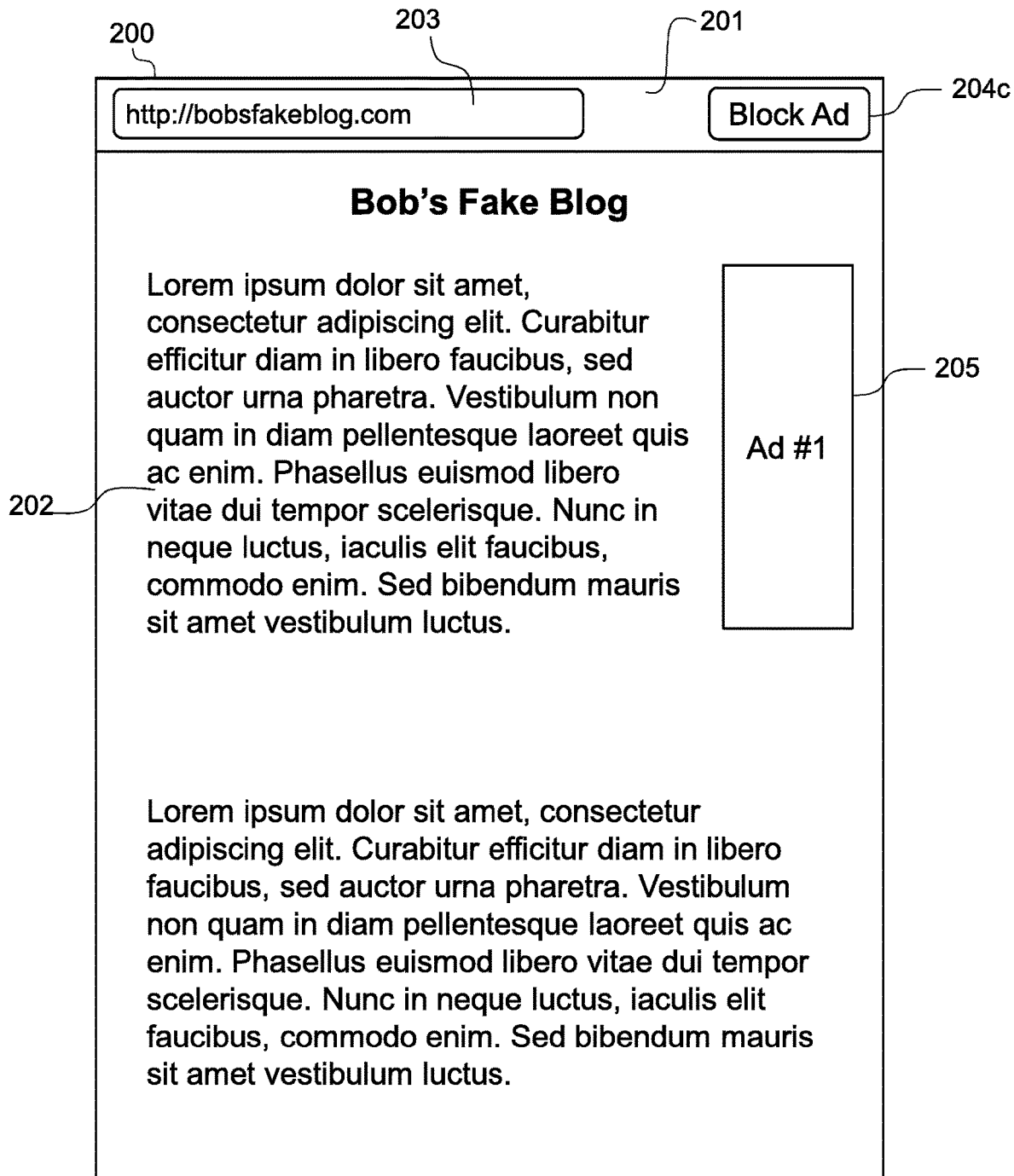

FIGS. 2A, 2B, and 2C show illustrative graphical user interfaces (GUIs) for blocking online advertisements, according to some embodiments of the present disclosure.

Referring to FIG. 2A, an illustrative GUI 200 may be generated by a web browser running on a user device (e.g., browser 108 of FIG. 1). The GUI 200 can include a header portion 201 and a content portion 202. In some embodiments, GUI 200 may correspond to a GUI used within a web browser. For example, header portion 201 may correspond to the browser's toolbar, and content portion 202 may correspond to portion of the browser in which web pages are displayed.

The header portion 201 can include an address bar 203 and one or more ad blocking UI controls 204. As shown in FIG. 2A, the ad blocking UI controls can include a button ("Block Ad") 204a for initiating an ad block request. In some embodiments, ad blocking UI controls 204 can be implemented by a browser extension installed in the browser, such as browser extension 110 discussed in the context of FIG. 1.

The content portion 202 may include content for a particular website loaded in the browser. In the example shown, the browser is rendering the website at the URL "http://bobsfakeblog.com" which is entitled "Bob's Fake Blog." The content portion 202 may include, for example, text, images, videos, and other types of content. The content for a particular website may include ads, which may be legitimate or deceptive. As described earlier, legitimate ads refer to advertisements for legitimate goods and services. Deceptive ads are advertisements that are generally designed to scam those who click on them through phishing attacks that steal user's information. The ads may attempt to entice a user to click on them by claiming to be associated with a reputable company or by offering the chance to win goods or services.

First ad 205 and second ad 206 are ads displayed on GUI 200, first ad 205 being an ad that the user considers legitimate and second ad 206 being an ad that the user considers deceptive. Ad blocking tool 204 can operate via browser extension 110 when activated by user device 102. For example, a user may click on it with a cursor. In this example, a user would desire to disable, hide, or otherwise block second ad 206, as it is deceptive. It would also be beneficial to the owner or operator of bobsfakeblog.com for first ad 205 to remain unblocked, as the owner or operator may depend on the ad revenue generated from first ad 205. Traditional ad-blockers would block both first ad 205 and second ad 206, preventing the deceptive ad from being displayed but also ridding the owner or operator of the revenue from first ad 205.

Referring to FIG. 2B, after a user has activated the ad blocking tool (e.g., by clicking button 204a in FIG. 2A), the user may be provided with a UI tool for selecting an ad to block. For example, after clicking button 204a, the user may be presented with a "lasso" or other selection tool that enables the user to click and drag to create a shape surrounding the ad to define the selection 207. In some embodiments, the shape of the selection 207 may be a rectangle, as illustrated in FIG. 2B, however a skilled artisan will recognize that other selection shapes could also be used. In some embodiments, the user may select the html element (div/frame) that corresponds to the ad.

After the user has defined the selection 207, GUI 200 may present a UI control 208 that enables or requires the user to provide a reason for blocking second ad 206. In the embodiment of FIG. 2B, UI control 208 may be provided as a popup menu ("Why are you blocking this ad?") with one or more checkboxes or radio buttons corresponding to different reasons for blocking the ad. In the embodiment of FIG. 2B, the user may indicate the ad is being blocked because it is annoying ("Annoying"), fraudulent ("Fraud"), or another reason ("Other"), although many other reasons for blocking may be available. Once the user has selected a reason, the browser extension may send the ad block request to a server and the server may store the data from the request and use the data to generate a list of blocked ads. The ad blocking tool may be deactivated.

Referring to FIG. 2C, after a user has used the ad blocking tool 204 to select an ad to block and submit a block request, second ad 206 has been blocked and is no longer visible, while first ad 205, a legitimate ad, remains displayed on GUI 200 and continues to provide revenue for the owner or operator of GUI 200, bobsfakeblog.com. Button 204c is displayed on the GUI 200 as the ad blocking tool is no longer activated. As a result of the user's ad blocking actions, ads that are the same or similar to the blocked ad may then be blocked from rendering on devices for other users that also employ the browser extension. The determination of whether an ad will be blocked for other users may depend on various factors, which are discussed below in relation to FIG. 3.

Figure 3:
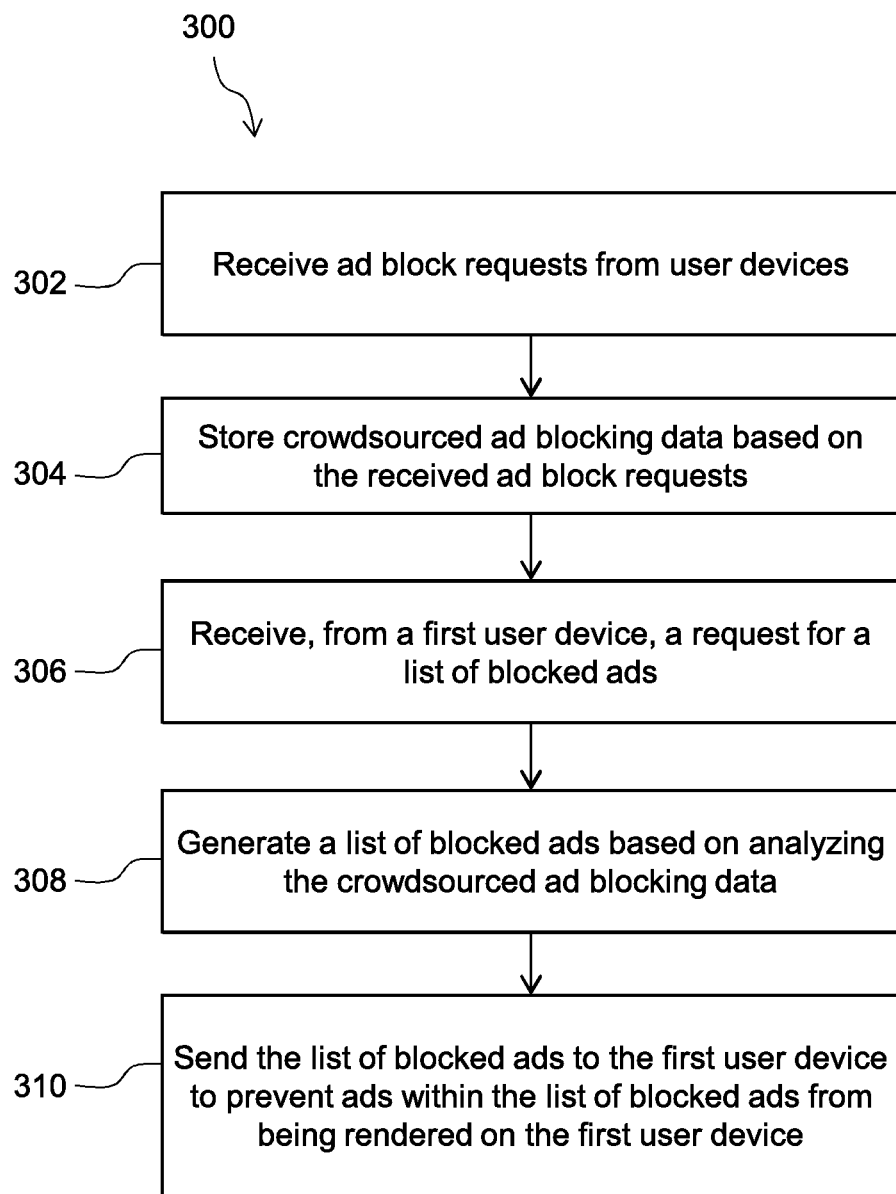
FIGS. 3 and 4 are flow diagrams showing processing that may occur within the system of FIG. 1, according to some embodiments of the present disclosure.

FIG. 3 is a flow diagram showing a process 300 that may occur within system 100 of FIG. 1, according to some embodiments of the present disclosure. At block 302, ad block requests are received from user devices. In some embodiments, ad block API module 118 may receive and process these requests from user devices. The request may include image data and a uniform resource locator (URL) associated with the ad. Preferably, this URL is the forwarding URL associated with the ad.

At block 304, crowdsourced ad blocking data based on the received ad block requests is stored. In some embodiments, database 122 may store the crowdsourced ad blocking data, which may include URLs, images, and user stats. At block 306, a request for a blacklist is received. In some embodiments, this request may be sent by a user device, for example, user device 102. The request may include image data and a forwarding URL associated with the ad.

At block 308, a blacklist is generated by analyzing the crowdsourced ad blocking data. The data may be the same as URLs 122a, images 122b, and user stats 122c in FIG. 1. The analysis may be performed by blacklist generator module 120. In some embodiments, the blacklist indicates whether an ad is fraudulent or deceptive. Various criteria may be used to generate the blacklist. In some embodiments, a reporting threshold may be used; if an ad has been reported as fraudulent by a threshold number of users using the ad blocking tool, then it may be put on the blacklist. In some embodiments, ads associated with URLs of known fraudulent entities may be added to the blacklist. In some embodiments, information the reporting users may be used to generate the blacklist. For example, ad blocking data from specific users may be excluded from the analysis if the user has sent more than a threshold number of ad block requests. This allows system 100 to detect users that over-report or, in some cases, simply report all ads, regardless of if the ads are deceptive or legitimate. The system may temporarily ignore ad block requests from these users, completely ignore these users, or administer an alert to those users. The alert may notify them that their requests are being excluded due to their high amount of ad block requests. In some embodiments, once an ad has been designated as fraudulent, it may be reported to a third party agency or organization. Example agencies include the Federal Communications Commission or the Better Business Bureau. This serves as an effort to cause the source of fraudulent ads to cease and desist. In system 100, fraud reporting module 121 may perform the reporting of the ads determined to be fraudulent. At block 310, the blacklist may be sent to a user device to prevent ads within the blacklist from being rendered on the user device.

Figure 4:
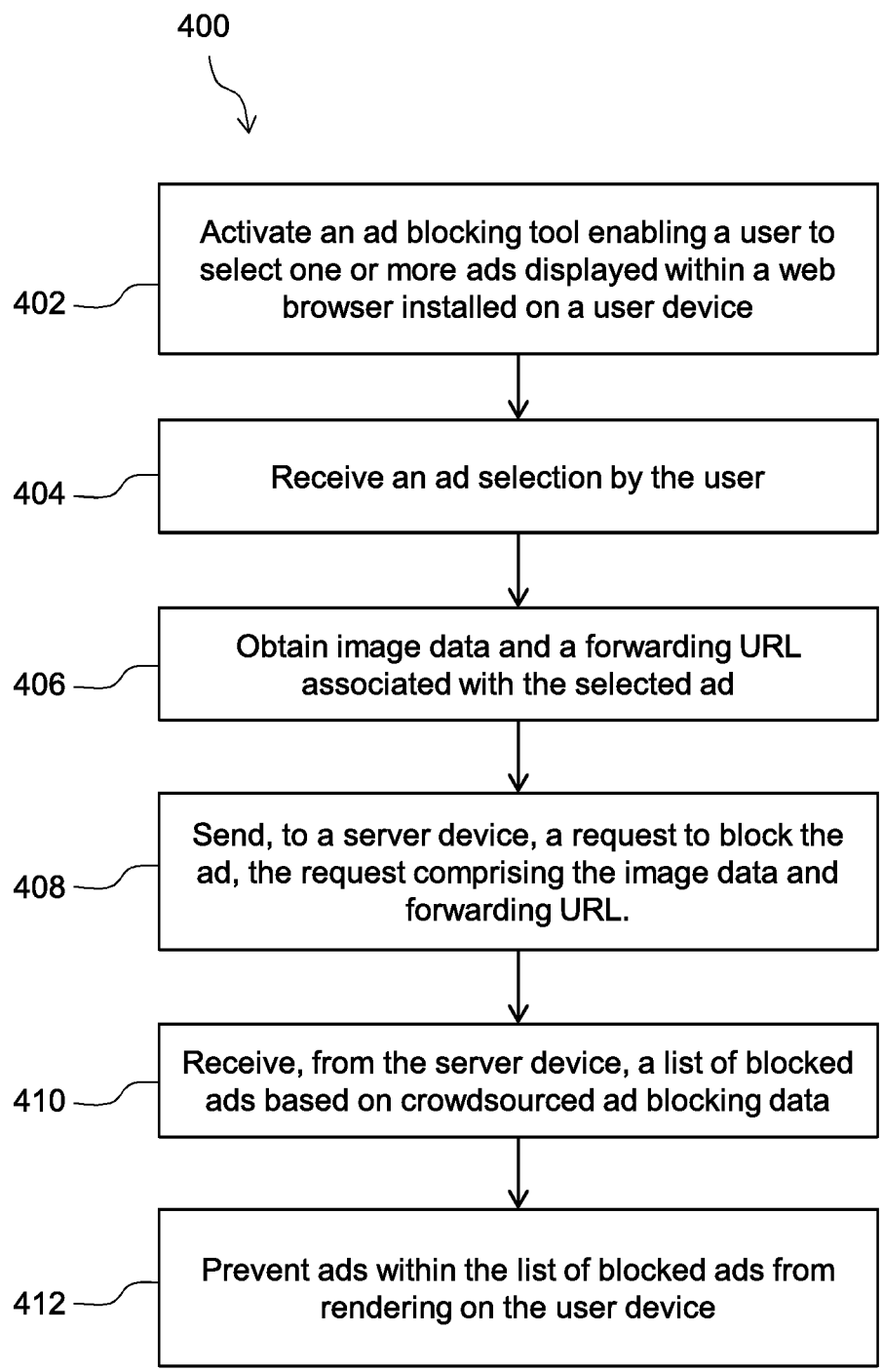

FIG. 4 is a flow diagram showing a process 400 that may occur within system 100 of FIG. 1, according to some embodiments of the present disclosure. At block 402, an ad blocking tool may be activated, enabling a user to select one or more ads displayed within a web browser installed on a user device. For example, the processing of block 402 may occur within web browser 108 on user device 102. UI tools 112 may also aid a user in selecting an ad. The user may use the cursor of a mouse or other selection tool to select an ad; the selection is then received at block 404. The selection may capture image data, the referrer URL, the forwarding URL, or other metadata of the ad.

At block 406, image data and a forwarding URL are obtained with the ad selection made by the user. The forwarding URL and image data are associated with the ad. At block 408, a request is sent to a server device, the request including the forwarding URL and image data of the selected ad. The server device may be server device 104. At block 410, a blacklist is received from the server device. Blacklist cache 116 may store the blacklist.

Once the ad block list has been received and stored, it may then be used to prevent fraudulent ads from rendering in future browsing sessions. At block 412, ads that correspond to ads on the blacklist are prevented from rendering. In some embodiments, while browser 108 is being used, ad comparison module 114 may analyze ads by comparing them to ads within the blacklist stored in blacklist cache 116. If an ad matches an ad within the blacklist beyond a certain threshold, it will be prevented from rendering.

In some embodiments, when an ad attempts to render on a browser, for example browser 108, ad comparison module 114 may compare its URL to the URLs stored in the blacklist. Due to their high amount of variability, the comparison preferably ignores the query parameters of the forwarding URL and only compares up to the query parameters. If the forwarding URL of an ad attempting to render on a user device matches a URL with an ad within the blacklist, the ad attempting to render will be blocked and prevented from rendering on the user device.

The comparison may also include analyzing the content of ads that attempt to render on user device 102 by comparing the content of the ad with the blacklist. In some embodiments, this may be done by comparing image data or various machine learning techniques, as described in the discussion of FIG. 1. Furthermore, the comparison step may include subtracting out areas of images with text via known techniques and comparing the background image data with the blacklist. In some embodiments, this may be done by ad comparison module 114. If the image data of an ad attempting to render on the user device matches an ad within the blacklist, the ad attempting to render will be blocked and prevented from rendering on the user device. The extent to which the ads must match in order to trigger blockage may be a perfect match or a threshold comparison.

Figure 5:
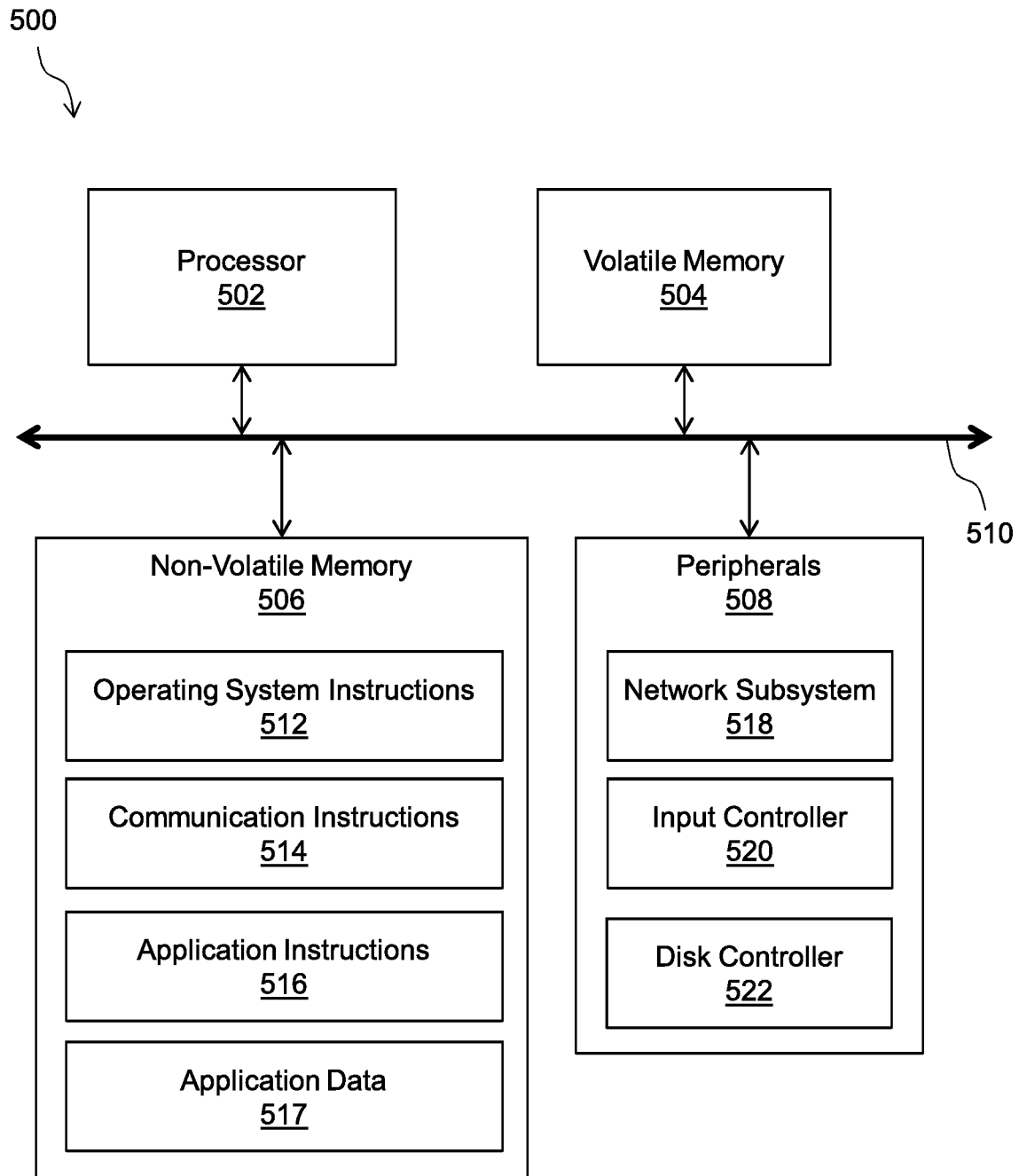
FIG. 5 is a diagram of an illustrative server device that can be used within the system of FIG. 1, according to some embodiments of the present disclosure.

FIG. 5 is a diagram of an illustrative server device 500 that can be used within system 100 of FIG. 1. Server device 500 may implement various features and processes as described herein. Server device 500 may be implemented on any electronic device that runs software applications derived from complied instructions, including without limitation personal computers, servers, smart phones, media players, electronic tablets, game consoles, email devices, etc. In some implementations, server device 500 may include one or more processors 502, volatile memory 504, non-volatile memory 506, and one or more peripherals 508. These components may be interconnected by one or more computer buses 510.

Processor(s) 502 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 510 may be any known internal or external bus technology, including but not limited to ISA, EISA, PCI, PCI Express, NuBus, USB, Serial ATA, or FireWire. Volatile memory 504 may include, for example, SDRAM. Processor 502 may receive instructions and data from a read-only memory or a random access memory or both. The essential elements of a computer may include a processor for executing instructions and one or more memories for storing instructions and data.

Non-volatile memory 506 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 506 may store various computer instructions including operating system instructions 512, communication instructions 514, application instructions 516, and application data 517. Operating system instructions 512 may include instructions for implementing an operating system (e.g., Mac OS®, Windows®, or Linux). The operating system may be multi-user, multiprocessing, multitasking, multithreading, real-time, and the like. Communication instructions 514 may include network communications instructions, for example, software for implementing communication protocols, such as TCP/IP, HTTP, Ethernet, telephony, etc. Application instructions 516 can include instructions for blocking online advertisements according to the systems and methods disclosed herein. For example, application instructions 516 may include instructions for components 118-122 described above in conjunction with FIG. 1. Application data 517 may include data corresponding to 122a-c described above in conjunction with FIG. 1.

Peripherals 508 may be included within server device 500 or operatively coupled to communicate with server device 500. Peripherals 508 may include, for example, network subsystem 518, input controller 520, and disk controller 522. Network subsystem 518 may include, for example, an Ethernet of WiFi adapter. Input controller 520 may be any known input device technology, including but not limited to a keyboard (including a virtual keyboard), mouse, track ball, and touch-sensitive pad or display. Disk controller 522 may include one or more mass storage devices for storing data files; such devices include magnetic disks, such as internal hard disks and removable disks; magneto-optical disks; and optical disks.

Figure 6:
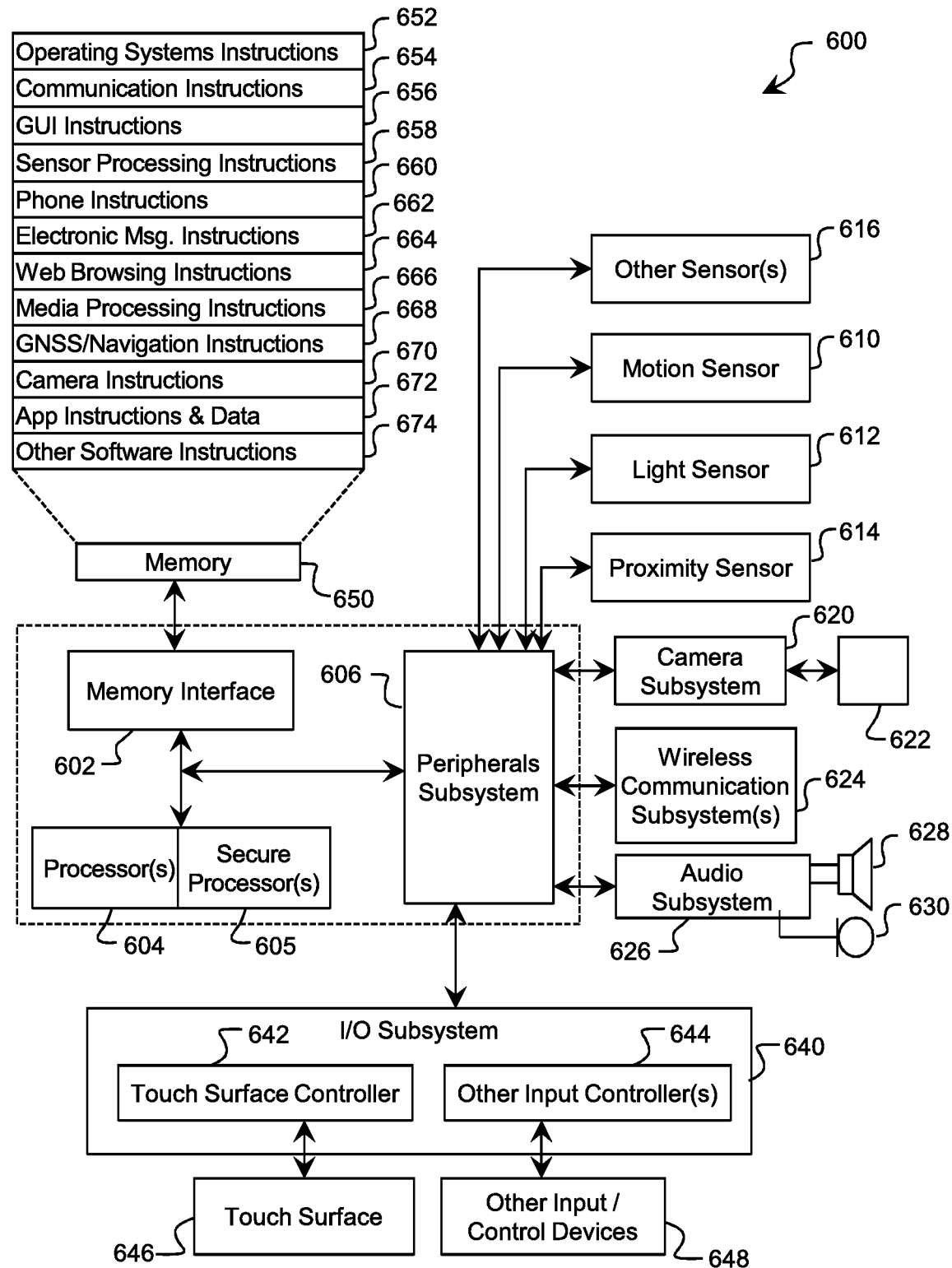
FIG. 6 is a diagram of an illustrative client device that can be used within the system of FIG. 1, according to an embodiment of the present disclosure.

FIG. 6 is an illustrative device 600 for blocking online advertisements within system 100 of FIG. 1, according to an embodiment of the present disclosure. In some embodiments, device 600 may be user device 102. The illustrative user device 600 may include a memory interface 602, one or more data processors, image processors, central processing units 604, and/or secure processing units 605, and peripherals subsystem 606. Memory interface 602, one or more processors 605 and/or secure processors 605, and/or peripherals interface 606 may be separate components or may be integrated in one or more integrated circuits. The various components in user device 600 may be coupled by one or more communication buses or signal lines.

Sensors, devices, and subsystems may be coupled to peripherals subsystem 606 to facilitate multiple functionalities. For example, motion sensor 610, light sensor 612, and proximity sensor 614 may be coupled to peripherals subsystem 606 to facilitate orientation, lighting, and proximity functions. Other sensors 616 may also be connected to peripherals subsystem 606, such as a global navigation satellite system (GNSS) (e.g., GPS receiver), a temperature sensor, a biometric sensor, magnetometer, or other sensing device, to facilitate related functionalities.

Camera subsystem 620 and optical sensor 622, e.g., a charged coupled device (CCD) or a complementary metal-oxide semiconductor (CMOS) optical sensor, may be utilized to facilitate camera functions, such as recording photographs and video clips. Camera subsystem 620 and optical sensor 622 may be used to collect images of a user to be used during authentication of a user, e.g., by performing facial recognition analysis.

Communication functions may be facilitated through one or more wired and/or wireless communication subsystems 624, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 624. The specific design and implementation of communication subsystems 624 may depend on the communication network(s) over which the user device 600 is intended to operate. For example, user device 600 may include communication subsystems 624 designed to operate over a GSM network, a GPRS network, an EDGE network, a WiFi or WiMax network, and a Bluetooth™ network. For example, wireless communication subsystems 624 may include hosting protocols such that device 600 can be configured as a base station for other wireless devices and/or to provide a WiFi service.

Audio subsystem 626 may be coupled to speaker 628 and microphone 630 to facilitate voice-enabled functions, such as speaker recognition, voice replication, digital recording, and telephony functions. Audio subsystem 626 may be configured to facilitate processing voice commands, voice-printing, and voice authentication, for example.

I/O subsystem 640 may include a touch-surface controller 642 and/or other input controller(s) 644. Touch-surface controller 642 may be coupled to a touch surface 646. Touch-surface 646 and touch-surface controller 642 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646.

The other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some implementations, a pressing of the button for a first duration may disengage a lock of touch-surface 646; and a pressing of the button for a second duration that is longer than the first duration may turn power to user device 600 on or off. Pressing the button for a third duration may activate a voice control, or voice command, module that enables the user to speak commands into microphone 630 to cause the device to execute the spoken command. The user may customize a functionality of one or more of the buttons. Touch-surface 646 can, for example, also be used to implement virtual or soft buttons and/or a keyboard.

In some implementations, user device 600 may present recorded audio and/or video files, such as MP3, AAC, and MPEG files. In some implementations, user device 600 may include the functionality of an MP3 player, such as an iPod™. User device 600 may, therefore, include a 36-pin connector and/or 8-pin connector that is compatible with the iPod. Other input/output and control devices may also be used.

Memory interface 602 may be coupled to memory 650. Memory 650 may include high-speed random access memory and/or non-volatile memory, such as one or more magnetic disk storage devices, one or more optical storage devices, and/or flash memory (e.g., NAND, NOR). Memory 650 may store an operating system 652, such as Darwin, RTXC, LINUX, UNIX, OS X, Windows, or an embedded operating system such as VxWorks.

Operating system 652 may include instructions for handling basic system services and for performing hardware dependent tasks. In some implementations, operating system 652 may be a kernel (e.g., UNIX kernel). In some implementations, operating system 652 may include instructions for performing voice authentication.

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic messaging-related process and functions; web browsing instructions 664 to facilitate web browsing-related processes and functions; media processing instructions 666 to facilitate media processing-related functions and processes; GNSS/Navigation instructions 668 to facilitate GNSS and navigation-related processes and instructions; and/or camera instructions 670 to facilitate camera-related processes and functions.

Memory 650 may store application (or "app") instructions and data 672, such as instructions for the apps described above in the context of FIGS. 1, 2A, 2B, 2C, 3, 4, and 5. Memory 650 may also store other software instructions 674 for various other software applications in place on device 600.

Each of the above identified instructions and applications may correspond to a set of instructions for performing one or more functions described herein. These instructions need not be implemented as separate software programs, procedures, or modules. Memory 650 may include additional instructions or fewer instructions. Furthermore, various functions of user device 600 may be implemented in hardware and/or in software, including in one or more signal processing and/or application specific integrated circuits.

In some embodiments, processor(s) 604 may perform processing including executing instructions stored in memory 650, and secure processor 605 may perform some processing in a secure environment that may be inaccessible to other components of user device 600. For example, secure processor 605 may include cryptographic algorithms on board, hardware encryption, and physical tamper proofing. Secure processor 605 may be manufactured in secure facilities. Secure processor 605 may encrypt data/challenges from external devices. Secure processor 605 may encrypt entire data packages that may be sent from user device 600 to the network. Secure processor 605 may separate a valid user/external device from a spoofed one, since a hacked or spoofed device may not have the private keys necessary to encrypt/decrypt, hash, or digitally sign data, as described herein.

Methods described herein may represent processing that occurs within a system for blocking online advertisements (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. A method to reduce fraud in computer networks, the method comprising:
   receiving, by a client device from a server device, crowdsourced ad blocking data, wherein the crowdsourced ad blocking data is generated based on requests from a plurality of user devices to block an ad displayed within a web browser installed on each respective user device, wherein each ad in the crowdsourced ad blocking data comprises image data and an ad characterization associated with the ad;
   storing, by the client device, the crowdsourced ad blocking data in local memory;
   transmitting, by the client device via a web browser executing thereon, a hyper text transfer protocol (HTTP) request to a third party server;
   receiving, by the client device, a web page associated with the HTTP request from the third party server; and
   preventing, by the client device, ads within the crowdsourced ad blocking data from rendering within the web browser by:
      identifying a target ad contained in the web page;
      comparing content of the target ad to each ad in the crowdsourced ad blocking data using the image data corresponding to each ad; and
      blocking the target ad from rendering in the web browser upon detecting that the content of the target ad matches at least one ad in the crowdsourced ad blocking data.

2. The method of claim 1, wherein comparing the content of the target ad to each ad in the crowdsourced ad blocking data using the image data corresponding to each ad comprises:
subtracting out portions of the image data comprising text; and
comparing background image data of each ad with the target ad.

3. The method of claim 1, wherein comparing the content of the target ad to each ad in the crowdsourced ad blocking data using the image data corresponding to each ad comprises:
executing a machine learning algorithm to compare the content of the target ad to each ad in the crowdsourced ad blocking data using the image data corresponding to each ad.

4. The method of claim 1, wherein the ad blocking data further comprises a forwarding URL associated with each ad.

5. The method of claim 3, further comprising:
receiving a forwarding URL associated with the target ad; and
comparing the forwarding URL associated with the target ad to forwarding URLs associated with each ad.

6. The method of claim 1, wherein the ad characterization comprises an indication of whether the ad is fraudulent.

7. The method of claim 6, wherein identifying the target ad in the web page, comprises:
determining that the target ad is fraudulent based on a corresponding ad characterization in the crowdsourced ad blocking data.

8. A non-transitory computer readable medium including one or more sequences of instructions that, when executed by one or more processors, cause the one or more processors to perform operations comprising:
accessing, by a client device, crowdsourced ad blocking data, wherein the crowdsourced ad blocking data is generated based on requests from a plurality of user devices to block an ad displayed within a web browser installed on each respective user device, wherein each ad in the crowdsourced ad blocking data comprises image data and an ad characterization associated with the ad;
transmitting, by the client device via a web browser executing thereon, a hyper text transfer protocol (HTTP) request to a third party server;
receiving, by the client device, a web page associated with the HTTP request from the third party server; and
preventing, by the client device, ads within the crowdsourced ad blocking data from rendering within the web browser by:
identifying a target ad contained in the web page;
comparing content of the target ad to each ad in the crowdsourced ad blocking data using the image data corresponding to each ad; and
blocking the target ad from rendering in the web browser upon detecting that the content of the target ad matches at least one ad in the crowdsourced ad blocking data.

9. The non-transitory computer readable medium of claim 8, wherein comparing the content of the target ad to each ad in the crowdsourced ad blocking data using the image data corresponding to each ad comprises:
subtracting out portions of the image data comprising text; and
comparing background image data of each ad with the target ad.

10. The non-transitory computer readable medium of claim 8, wherein comparing the content of the target ad to each ad in the crowdsourced ad blocking data using the image data corresponding to each ad comprises:
executing a machine learning algorithm to compare the content of the target ad to each ad in the crowdsourced ad blocking data using the image data corresponding to each ad.

11. The non-transitory computer readable medium of claim 8, wherein the ad blocking data further comprises a forwarding URL associated with each ad.

12. The non-transitory computer readable medium of claim 11, further comprising:
receiving the forwarding URL associated with the target ad; and
comparing the forwarding URL associated with the target ad to forwarding URLs associated with each ad.

13. The non-transitory computer readable medium of claim 8, wherein the ad characterization comprises an indication of whether the ad is fraudulent.

14. The non-transitory computer readable medium of claim 13, wherein identifying the target ad in the web page, comprises:
determining that the target ad is fraudulent based on a corresponding ad characterization in the crowdsourced ad blocking data.

15. A system, comprising:
a processor; and
a memory having programming instructions stored thereon, which, when executed by the processor, causes the system to perform operations comprising:
receiving, from a server device, crowdsourced ad blocking data, wherein the crowdsourced ad blocking data is generated based on requests from a plurality of user devices to block an ad displayed within a web browser installed on each respective user device, wherein each ad in the crowdsourced ad blocking data comprises image data and an ad characterization associated with the ad;
storing the crowdsourced ad blocking data in local memory;
transmitting, via a web browser executing thereon, a hyper text transfer protocol (HTTP) request to a third party server;
receiving a web page associated with the HTTP request from the third party server; and
preventing ads within the crowdsourced ad blocking data from rendering within the web browser by:
identifying a target ad contained in the web page;
comparing content of the target ad to each ad in the crowdsourced ad blocking data using the image data corresponding to each ad; and
blocking the target ad from rendering in the web browser upon detecting that the content of the target ad matches at least one ad in the crowdsourced ad blocking data.

16. The system of claim 15, wherein comparing the content of the target ad to each ad in the crowdsourced ad blocking data using the image data corresponding to each ad comprises:
subtracting out portions of the image data comprising text; and
comparing background image data of each ad with the target ad.

17. The system of claim 15, wherein comparing the content of the target ad to each ad in the crowdsourced ad blocking data using the image data corresponding to each ad comprises:

executing a machine learning algorithm to compare the content of the target ad to each ad in the crowdsourced ad blocking data using the image data corresponding to each ad.

18. The system of claim 15, wherein the ad blocking data further comprises a forwarding URL associated with each ad.

19. The system of claim 18, further comprising:
receiving the forwarding URL associated with the target ad; and
comparing the forwarding URL associated with the target ad to forwarding URLs associated with each ad.

20. The system of claim 15, wherein the ad characterization comprises an indication of whether the ad is fraudulent.

* * * * *